United States Patent
Claassen et al.

(10) Patent No.: US 11,728,883 B2
(45) Date of Patent: *Aug. 15, 2023

(54) PASSIVE COLLECTION OF AIR-TO-GROUND NETWORK PARAMETERS FOR NETWORK PLANNING AND CONTROL

(71) Applicant: SMARTSKY NETWORKS LLC, Morrisville, NC (US)

(72) Inventors: David Claassen, Leesburg, VA (US); Douglas Hyslop, Vienna, VA (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/361,710

(22) Filed: Jun. 29, 2021

(65) Prior Publication Data

US 2021/0328657 A1  Oct. 21, 2021

Related U.S. Application Data

(63) Continuation of application No. 16/649,384, filed as application No. PCT/US2018/051642 on Sep. 19, 2018, now Pat. No. 11,082,124.

(Continued)

(51) Int. Cl.
*H04B 7/185*   (2006.01)
*H04B 17/318*  (2015.01)
(Continued)

(52) U.S. Cl.
CPC ....... *H04B 7/18506* (2013.01); *H04B 17/318* (2015.01); *H04W 24/02* (2013.01); *H04W 72/23* (2023.01); *H04W 72/52* (2023.01)

(58) Field of Classification Search
CPC ........... H04W 72/042; H04W 72/0486; H04W 24/02; H04B 7/18506; H04B 17/318
(Continued)

(56) References Cited

U.S. PATENT DOCUMENTS 8,688,101 B1 *  4/2014  Hayes ................... H04W 4/40
                                                   455/448
9,069,070 B2 *  6/2015  Savoy ................... G01S 19/15
(Continued)

FOREIGN PATENT DOCUMENTS

CN   101095333 A   12/2007
CN   102427237 A    4/2012
(Continued)

OTHER PUBLICATIONS

Office Action from related Chinese Application No. 201880061510.6 dated Jul. 26, 2021, all pages cited in its entirety.
(Continued)

*Primary Examiner* — William Nealon
(74) *Attorney, Agent, or Firm* — Burr & Forman LLP

(57) ABSTRACT

A network analytics control module may include processing circuitry configured to receive three dimensional location information and corresponding signal quality information for a particular asset in an air-to-ground (ATG) network, make a service quality inference for the particular asset based at least in part on the received information, and provide an instruction for a network control activity based on the service quality inference.

20 Claims, 7 Drawing Sheets

Related U.S. Application Data

(60) Provisional application No. 62/561,449, filed on Sep. 21, 2017.

(51) Int. Cl.
 *H04W 24/02* (2009.01)
 *H04W 72/23* (2023.01)
 *H04W 72/52* (2023.01)

(58) Field of Classification Search
 USPC .......................................................... 455/431
 See application file for complete search history.

(56) References Cited

U.S. PATENT DOCUMENTS

| | | | |
|---|---|---|---|
| 2006/0178141 A1 | 8/2006 | McGuffin et al. | |
| 2007/0161347 A1 | 7/2007 | Ma | |
| 2011/0009056 A1* | 1/2011 | Hanson | H04W 24/02 455/509 |
| 2012/0231788 A1* | 9/2012 | Kaminski | H01Q 1/246 343/705 |
| 2014/0266896 A1* | 9/2014 | Hyslop | H04B 7/18506 342/368 |
| 2015/0280806 A1 | 10/2015 | Jalali | |
| 2016/0112116 A1* | 4/2016 | Jalali | H04W 24/10 370/252 |
| 2016/0205560 A1 | 7/2016 | Hyslop | |
| 2016/0227460 A1* | 8/2016 | Hyslop | H04W 4/02 |
| 2017/0163336 A1* | 6/2017 | Jalali | H04B 7/0617 |

FOREIGN PATENT DOCUMENTS

| | | |
|---|---|---|
| CN | 102938670 B | 2/2015 |
| CN | 107078819 A | 8/2017 |
| EP | 2161855 A1 | 3/2010 |
| EP | 2323216 A1 | 5/2011 |
| JP | 2016522997 A | 8/2016 |
| WO | 2016115061 A1 | 7/2016 |

OTHER PUBLICATIONS

International Search Report and Written Opinion from related International Application No. PCT/US2018/051649 dated Nov. 30, 2018, all pages cited in its entirety.

Notification of Reason(s) for Refusal Received from corresponding Japanese application No. JP 2020-516718 dated Oct. 4, 2022, all pages cited in its entirety.

\* cited by examiner

PASSIVE COLLECTION OF AIR-TO-GROUND NETWORK PARAMETERS FOR NETWORK PLANNING AND CONTROL

TECHNICAL FIELD

Example embodiments generally relate to wireless communications and, more particularly, relate to the control of various aspects within an air-to-ground (ATG) network.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft, and have frequently been disappointed with the service provided.

Conventional ground based communication systems have been developed and matured over the past couple of decades. While advances continue to be made in relation to ground based communication, and one might expect that some of those advances may also be applicable to communication with aviation platforms, the fact that conventional ground based communication involves a two dimensional coverage paradigm and that air-to-ground (ATG) communication is a three dimensional problem means that there is not a direct correlation between the two environments. Instead, many additional factors must be considered in the context of ATG relative to those considered in relation to ground based communication.

BRIEF SUMMARY OF SOME EXAMPLES

Some example embodiments may therefore be provided to enhance the network control options and capabilities that can be provided within an ATG network. The control options and capabilities may be used to improve the quality of service and enable the proactive identification and correction of issues that impact network performance. For example, information may be gathered regarding a number of different system performance related parameters so that such information can be studied to proactively address various issues that can be identified from the information. As such, for example, equipment performance can be evaluated remotely, network planning and expansion may be conducted intelligently, and information regarding customer satisfaction with service can be determined (or inferred) to enable customer service initiatives to be deployed proactively.

In one example embodiment, a network analytics control module may include processing circuitry configured to receive three dimensional location information and corresponding signal quality information for a particular asset in an ATG network, make a service quality inference for the particular asset based at least in part on the received information, and provide an instruction for a network control activity based on the service quality inference.

In another example embodiment, an ATG network is provided. The network may include a plurality of base stations disposed at respective fixed geographic locations, at least one aircraft, a beamforming control module and a network analysis control module. The beamforming control module may include processing circuitry configured to provide instructions to direct beam formation from an antenna array of the aircraft or one of the base stations based on three dimensional location information associated with the aircraft. The network analysis control module may include processing circuitry configured to receive the three dimensional location information and corresponding signal quality information for a particular asset in the ATG network, make a service quality inference for the particular asset based at least in part on the received information, and provide an instruction for a network control activity based on the service quality inference.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
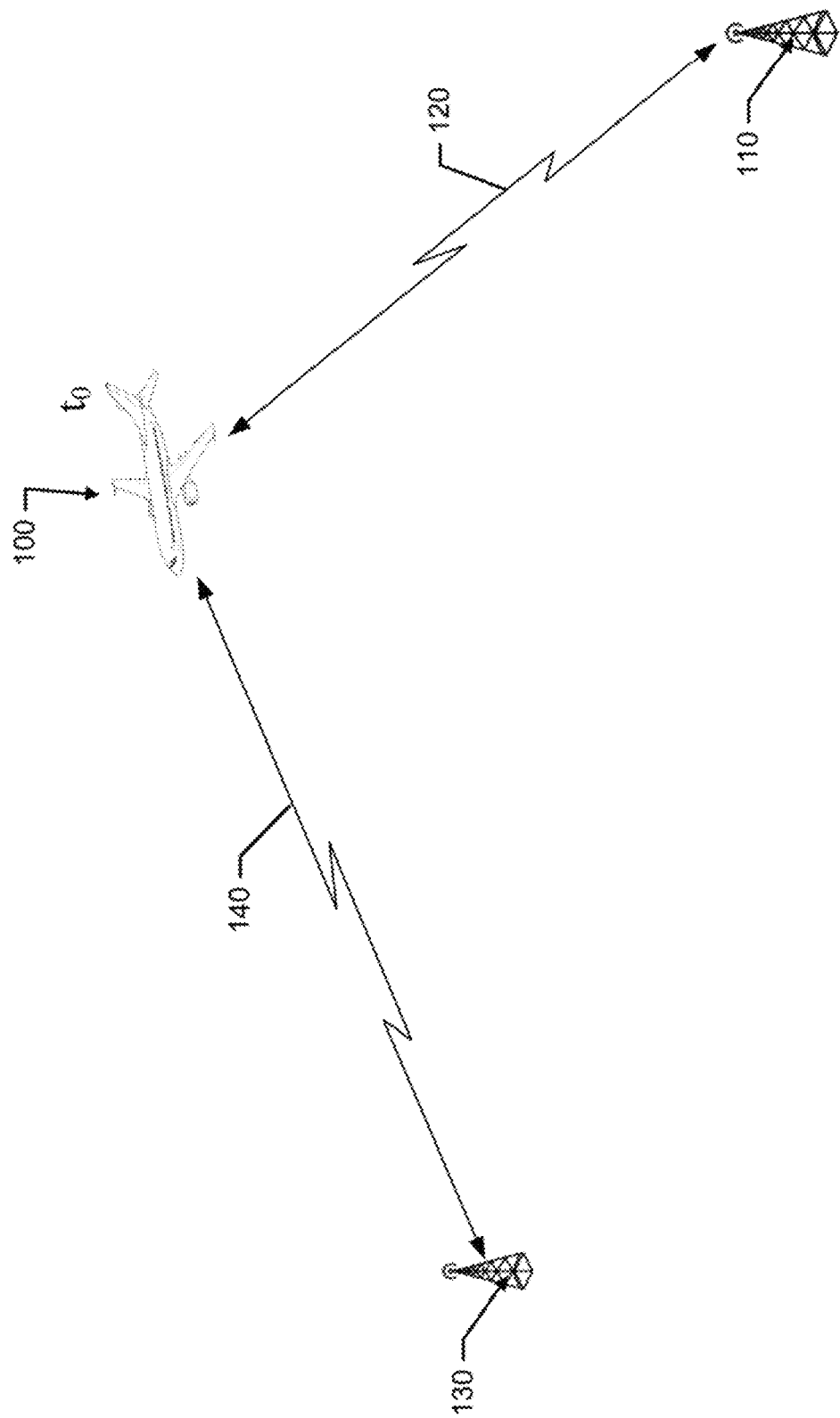
FIG. 1 illustrates an aircraft moving through the coverage areas of different base stations over time in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the terms "data," "content," "information" and similar terms may be used interchangeably to refer to data capable of being transmitted, received and/or stored in accordance with example embodiments. Thus, use of any such terms should not be taken to limit the spirit and scope of example embodiments.

As used herein, the terms "component," "module," and the like are intended to include a computer-related entity, such as but not limited to hardware, firmware, or a combination of hardware and software. For example, a component or module may be, but is not limited to being, a process running on a processor, a processor, an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Typical wireless communication systems include end-user devices, which may be used at a particular location or in a mobile setting, and a fixed set of equipment with access to interconnection to the Internet and/or the Public Switched Telephone Network (PSTN). The end user device communicates wirelessly with the fixed equipment, referred to as the base station. In an ATG context, the base station is one of a plurality of base stations that are deployed on the ground to be partially overlapping with adjacent base stations to provide continuous and uninterrupted coverage over a particular geographic area, while the movile equipment includes devices on various aircraft. The base stations are interconnected with each other to form a network, and may also be interconnected with other networks via a backhaul network or assembly.

In some examples, the ATG network may be designed to employ beamforming technology to communicate more efficiently and reliably. In this regard, for example, beams may be formed at or steered to desirable locations within a coverage area of a cell defined by a base station (or an aircraft) to extend range, reduce interference, and provide other enhanced communication capabilities. Whether the beams are steered or formed within this context, the control of the beams may be referred to as beamforming, and may be controlled by a beamforming control module. In some embodiments, the beamforming control module may be provided at mobile nodes of an air-to-ground network (e.g., aircraft), base stations of the network, and or at a network controller either at a central network location or in the cloud. The beamforming control module may utilize position information of both the base stations and the mobile nodes to determine (predictively or in real-time) where to steer beams to ensure continuous communication can be maintained both within an individual cell and when a handover to another cell is desirable.

In some embodiments, a base station employing beamforming may employ an antenna array to generate (e.g., form) or steer beams in the direction of the target device, enhancing the coverage range when the location of the device is known relative to the base station. When the location of the device is not known to the base station, then a beam may not be formed in the direction of the target device and the coverage range of the base station would effectively be reduced. A wireless system must be designed to provide for the lowest common denominator. If a device accessing the system for the first time has a less favorable coverage range, then the base stations must be placed closer together to ensure the unknown devices may gain access to the system. Placing the base stations closer together increases the network cost.

If a wireless device has not yet been in contact with the base station, then the device may end up with insufficient coverage margin to communicate with the base station because the beamforming gain is not present. Therefore, the initial synchronization of the wireless device with the base station is a potential problem in a wireless system employing beamforming. To address this potential problem, it may be possible to utilize position information of receiving stations and base stations to facilitate beamforming at either or both ends of the wireless communication links that are to be established.

In an ATG communications system, the end-user equipment (or receiving stations) may be installed or otherwise present on an aircraft or other aerial platform. Thus, as mentioned above, the utilization of position information may not simply involve knowledge of latitude and longitude, relative positioning, global positioning system (GPS) coordinates, and/or the like. Instead, knowledge of three dimensional (3D) position information including altitude may be required. Speed, course, and any other information descriptive of the current 3D position and likely future positions may also be helpful in some cases. When the 3D position of aircraft (or communication devices thereon) are known, this location-specific information may be employed by the wireless system to enhance the initial synchronization coverage range by enhancing beamforming.

In some cases, the knowledge of locations of fixed assets (i.e., base stations) may be known in advance and, for example, may be stored at a location accessible to any or all assets of the network. Knowledge of movable device locations (e.g., aircraft) may be actively tracked for all devices (e.g., all aircraft or other known receiving devices on the aircraft) in the 3D airspace. As an example, aircraft (or devices thereon) taking off from an airport may access and synchronize with a base station near the airport. Once known to the wireless system, each device may periodically transmit position information (e.g., coordinates, altitude, and speed) to the serving base station. The base station may share the position information with a centralized server or other device in the core network, or in the cloud. The centralized server (or other processing device) may then track each device, compare the device location against a database of base stations in the system, and determine when a particular device may be moving into a different base station's coverage area. The device location may be shared with the new base station, and the new base station may then form a directional beam toward the wireless device to share synchronization information.

Example embodiments may therefore combine knowledge of fixed base stations positions (e.g., in 2D) with knowledge of moving receiving station positions (e.g., in 3D) to provide beamforming from both the aircraft (or devices thereon) and the base station when the device has not yet acquired a neighboring base station. Full beamforming coverage benefits may therefore be maintained within an ATG system, reducing the cost of network coverage and improving handoff reliability. The improved gain by using directed beams may enable aircraft to engage in communications with potentially distant base stations on the ground. Accordingly, an ATG network may potentially be built with base stations that are much farther apart than the typical distance between base stations in a terrestrial network.

However, more information than merely the locations of the assets within the network may be available in some cases. For example, numerous other parameters may be known or knowable, and such parameters, if analyzed, may enable yet further advantageous network control. For example, signal strength information, radio status (e.g., on/off status), and perhaps also other parameters may be stored for real time and/or post hoc analysis. Numerous determinations regarding system performance may be made based on this information to further enhance services that can be offered, proactive system maintenance or issue resolution, and/or the like.

FIG. 1 illustrates a conceptual view of an aircraft moving through a coverage zone of different base stations to illustrate an example embodiment. As can be seen in FIG. 1, an aircraft 100 may be in communication with a first base station (BS) 110 at time to via a wireless communication link 120. The aircraft 100 may therefore include wireless communication equipment onboard that enables the aircraft 100 to communicate with the first BS 110, and the first BS 110 may also include wireless communication equipment enabling communication with the aircraft 100. As will be discussed in greater detail below, the wireless communication equipment at each end may include radio hardware and/or software for processing wireless signals received at corresponding antenna arrays that are provided at each respective device in communication with their respective radios. Moreover, the wireless communication equipment of example embodiments may be configured to employ beamforming techniques to utilize directive focusing, steering, and/or formation of beams using the antenna arrays. Accordingly, for the purposes of this discussion, it should be assumed that the wireless communication link 120 between the aircraft 100 and the first BS 110 may be formed using at least one link established via beamforming. In other words, either the first BS 110 or the aircraft 100, or both, may include radio control circuitry capable of employing beamforming techniques for establishment of the wireless communication link 120.

The first BS 110 has a fixed position geographically and therefore position information regarding the location of the first BS 110 can be known. In some cases, an estimate of the coverage area defining the region in which first BS 110 is capable of providing wireless connectivity to aircraft may also be known or estimable (e.g., at the aircraft 100 and/or at the first BS 110 or another network location). Meanwhile, the position of the aircraft in 3D space may also be known or estimable at any given time (e.g., at the aircraft 100 and/or at the first BS 110 or another network location). Furthermore, it should be appreciated that the coverage area of the first BS 110 may possibly be altitude dependent, in some cases. In this regard, for example, the latitudinal and longitudinal coverage area projected onto the surface of the earth for the first BS 110 may be differently sized for different altitudes. Accordingly, for example, based on the known position and coverage characteristics of the first BS 110 and the position information of the aircraft 100 at time to, it may be determinable that the aircraft 100 is nearing or at the edge of the coverage area of the first BS 110 at time to.

A second BS 130, which may have similar performance and functional characteristics to those of the first BS 110, may be located geographically such that, for the current track of the aircraft 100, the second BS 130 is a candidate for handover of the aircraft 100 to maintain a continuous and uninterrupted communication link between the aircraft 100 and ground-based base stations of an ATG wireless communication network at time to. As discussed above, it may be helpful for the second BS 130 to be aware of the approach of the aircraft 100 so that the second BS 130 can employ beamforming techniques to direct a beam toward the aircraft 100 either when or prior to the aircraft 100 reaching the coverage area of the second BS 130. Additionally or alternatively, it may be helpful for the aircraft 100 to be aware of the existence and location of the second BS 130 so that the wireless communication equipment on the aircraft 100 may employ beamforming techniques to direct a beam toward the second BS 130 either when or prior to the aircraft 100 reaching the coverage area of the second BS 130. Thus, at least one of the second BS 130 or the wireless communication equipment on the aircraft 100 may employ beamforming techniques assisted by knowledge of position information to facilitate establishment of the wireless communication link 140 between the wireless communication equipment on the aircraft 100 and the second BS 130.

Figure 2:
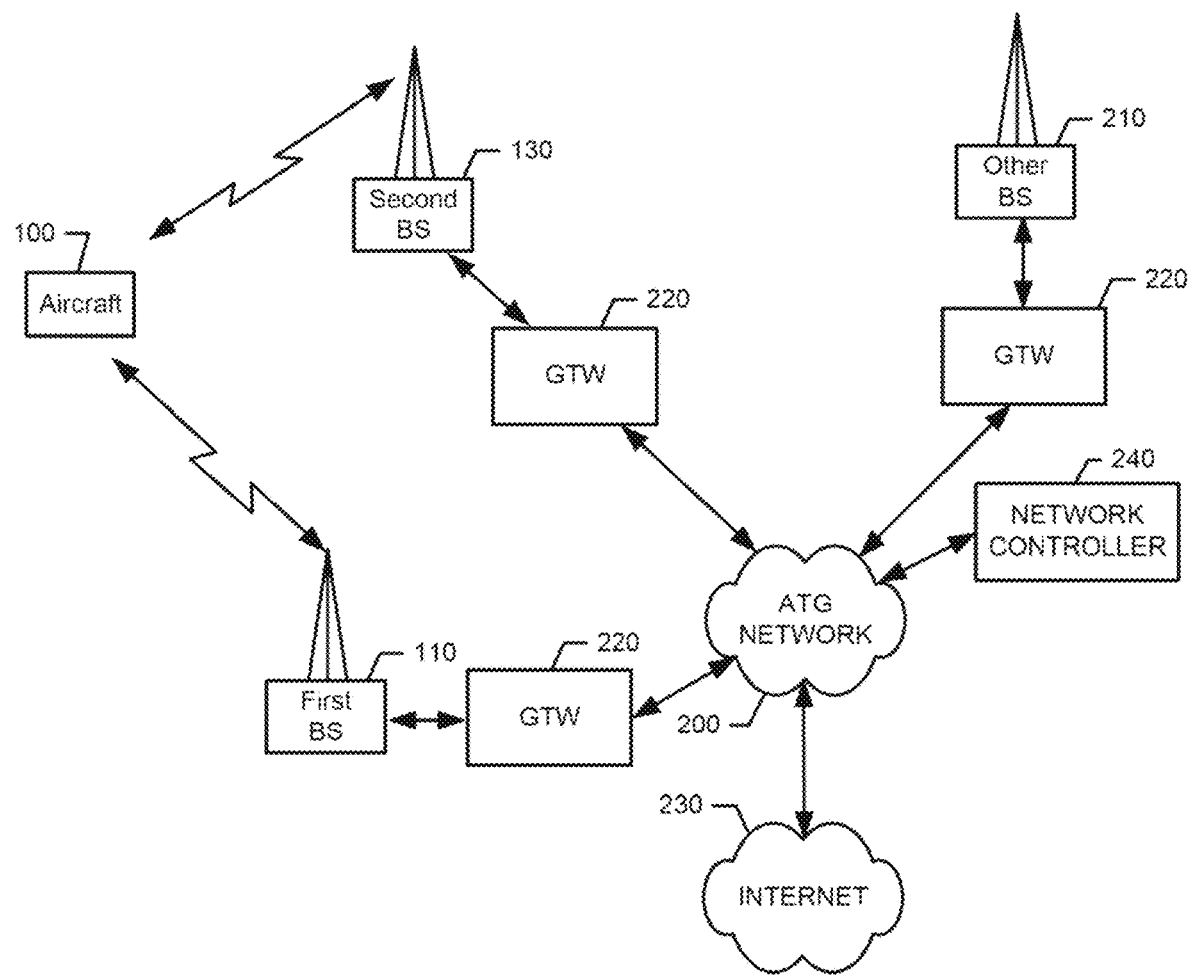
FIG. 2 illustrates a block diagram of a system for employing positional information for assisting with beamforming in accordance with an example embodiment.

In accordance with an example embodiment, a beamforming control module may be provided that employs both 2D knowledge of fixed base station location and 3D knowledge of position information regarding a receiving station on an aircraft to assist in application of beamforming techniques. The beamforming control module of an example embodiment may be physically located at any of a number of different locations within an ATG communication network. For example, the beamforming control module may be located at the aircraft 100, at either or both of the first and second BS 110 and 130, or at another location in the network or in the cloud. FIG. 2 illustrates a functional block diagram of an ATG communication network that may employ an example embodiment of such a beamforming control module.

As shown in FIG. 2, the first BS 110 and second BS 130 may each be base stations of an ATG network 200. The ATG network 200 may further include other BSs 210, and each of the BSs may be in communication with the ATG network 200 via a gateway (GTW) device 220. The ATG network 200 may further be in communication with a wide area network such as the Internet 230 or other communication networks. In some embodiments, the ATG network 200 may include or otherwise be coupled to a packet-switched core network.

In an example embodiment, the ATG network 200 may include a network controller 240 that may include, for example, switching functionality. Thus, for example, the network controller 240 may be configured to handle routing calls to and from the aircraft 100 (or to communication equipment on the aircraft 100) and/or handle other data or communication transfers between the communication equipment on the aircraft 100 and the ATG network 200. In some embodiments, the network controller 240 may function to provide a connection to landline trunks when the communication equipment on the aircraft 100 is involved in a call. In addition, the network controller 240 may be configured for controlling the forwarding of messages and/or data to and from the mobile terminal 10, and may also control the forwarding of messages for the base stations. It should be noted that although the network controller 240 is shown in the system of FIG. 2, the network controller 240 is merely an exemplary network device and example embodiments are not limited to use in a network employing the network controller 240.

The network controller 240 may be coupled to a data network, such as a local area network (LAN), a metropolitan area network (MAN), and/or a wide area network (WAN) (e.g., the Internet 230) and may be directly or indirectly coupled to the data network. In turn, devices such as processing elements (e.g., personal computers, laptop computers, smartphones, server computers or the like) can be coupled to the communication equipment on the aircraft 100 via the Internet 230.

Although not every element of every possible embodiment of the ATG network 200 is shown and described herein, it should be appreciated that the communication equipment on the aircraft 100 may be coupled to one or more of any of a number of different networks through the ATG network 200. In this regard, the network(s) can be capable of supporting communication in accordance with any one or more of a number of first-generation (1G), second-generation (2G), third-generation (3G), fourth-generation (4G) and/or future mobile communication protocols or the like. In some cases, the communication supported may employ communication links defined using unlicensed band frequencies such as 2.4 GHz or 5.8 GHz. However, communications may be supported by other frequencies in licensed bands additionally or alternatively. Moreover, it may be possible to switch between licensed and unlicensed band communications (and/or satellite communications) under the control of the network controller 240 in some cases. Additionally, in some cases, the ATG network 200 may be augmented by or operate in parallel with a satellite communication system and switching may be performed to handle communications alternately between either the ATG network 200 or the satellite communications system in some cases under the control of the network controller 240.

As indicated above, a beamforming control module may be employed on wireless communication equipment at either or both of the network side or the aircraft side in example embodiments. Thus, in some embodiments, the beamforming control module may be implemented in a receiving station on the aircraft (e.g., a passenger device or device associated with the aircraft's communication system). In some embodiments, the beamforming control module may be implemented in the network controller 240 or at some other network side entity. Moreover, in some cases, the beamforming control module may be implemented at an entity located in the cloud (e.g., at a location that is operably coupled to the ATG network 200 via the Internet 230).

Figure 3:
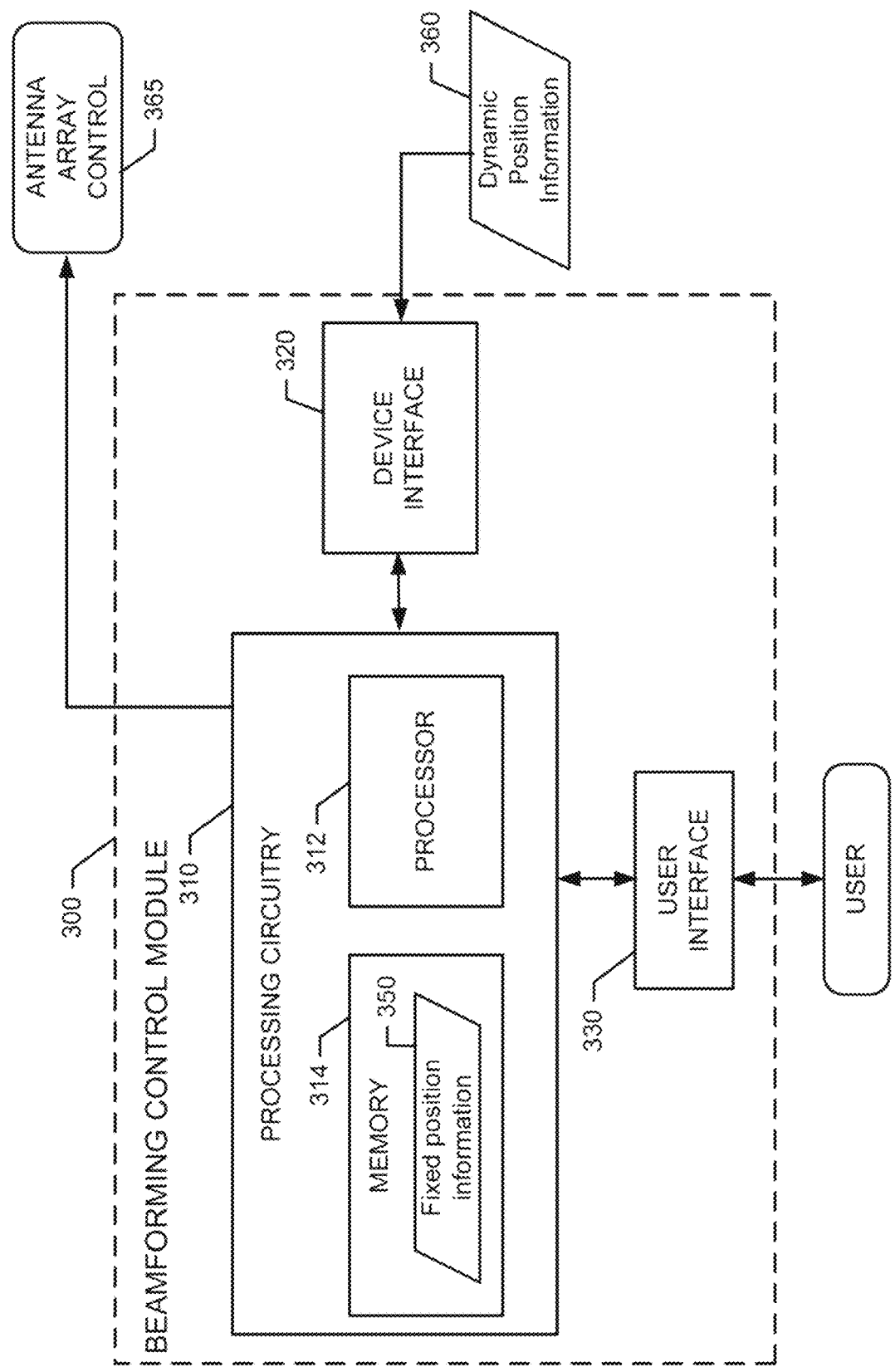
FIG. 3 illustrates beamforming control circuitry that may be employed to assist in using positional information for assisting with beamforming according to an example embodiment.

FIG. 3 illustrates the architecture of a beamforming control module 300 in accordance with an example embodiment. The beamforming control module 300 processing circuitry 310 configured to provide control outputs for generation of beams from an antenna array disposed at either the aircraft 100 or one of the base stations based on processing of various input information. The processing circuitry 310 may be configured to perform data processing, control function execution and/or other processing and management services according to an example embodiment of the present invention. In some embodiments, the processing circuitry 310 may be embodied as a chip or chip set. In other words, the processing circuitry 310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 310 may include one or more instances of a processor 312 and memory 314 that may be in communication with or otherwise control a device interface 320 and, in some cases, a user interface 330. As such, the processing circuitry 310 may be embodied as a circuit chip (e.g., an integrated circuit chip) configured (e.g., with hardware, software or a combination of hardware and software) to perform operations described herein. However, in some embodiments, the processing circuitry 310 may be embodied as a portion of an on-board computer. In some embodiments, the processing circuitry 310 may communicate with various components, entities and/or sensors of the ATG network 200.

The user interface 330 (if implemented) may be in communication with the processing circuitry 310 to receive an indication of a user input at the user interface 330 and/or to provide an audible, visual, mechanical or other output to the user. As such, the user interface 330 may include, for example, a display, one or more levers, switches, indicator lights, buttons or keys (e.g., function buttons), and/or other input/output mechanisms.

The device interface 320 may include one or more interface mechanisms for enabling communication with other devices (e.g., modules, entities, sensors and/or other components of the ATG network 200). In some cases, the device interface 320 may be any means such as a device or circuitry embodied in either hardware, or a combination of hardware and software that is configured to receive and/or transmit data from/to modules, entities, sensors and/or other components of the ATG network 200 that are in communication with the processing circuitry 310.

The processor 312 may be embodied in a number of different ways. For example, the processor 312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 312 may be configured to execute instructions stored in the memory 314 or otherwise accessible to the processor 312. As such, whether configured by hardware or by a combination of hardware and software, the processor 312 may represent an entity (e.g., physically embodied in circuitry—in the form of processing circuitry 310) capable of performing operations according to embodiments of the present invention while configured accordingly. Thus, for example, when the processor 312 is embodied as an ASIC, FPGA or the like, the processor 312 may be specifically configured hardware for conducting the operations described herein. Alternatively, as another example, when the processor 312 is embodied as an executor of software instructions, the instructions may specifically configure the processor 312 to perform the operations described herein.

In an example embodiment, the processor 312 (or the processing circuitry 310) may be embodied as, include or otherwise control the operation of the beamforming control module 300 based on inputs received by the processing circuitry 310 responsive to receipt of position information associated with various relative positions of the communicating elements of the network. As such, in some embodiments, the processor 312 (or the processing circuitry 310) may be said to cause each of the operations described in connection with the beamforming control module 300 in relation to adjustments to be made to antenna arrays to undertake the corresponding functionalities relating to beamforming responsive to execution of instructions or algorithms configuring the processor 312 (or processing circuitry 310) accordingly. In particular, the instructions may include instructions for processing 3D position information of a moving receiving station (e.g., on an aircraft) along with 2D position information of fixed transmission sites in order to instruct an antenna array to form a beam in a direction that will facilitate establishing a communication link between the moving receiving station and one of the fixed transmission stations as described herein.

In an exemplary embodiment, the memory 314 may include one or more non-transitory memory devices such as, for example, volatile and/or non-volatile memory that may be either fixed or removable. The memory 314 may be configured to store information, data, applications, instructions or the like for enabling the processing circuitry 310 to carry out various functions in accordance with exemplary embodiments of the present invention. For example, the memory 314 could be configured to buffer input data for processing by the processor 312. Additionally or alternatively, the memory 314 could be configured to store instructions for execution by the processor 312. As yet another alternative, the memory 314 may include one or more databases that may store a variety of data sets responsive to input sensors and components. Among the contents of the memory 314, applications and/or instructions may be stored for execution by the processor 312 in order to carry out the functionality associated with each respective application/instruction. In some cases, the applications may include instructions for providing inputs to control operation of the beamforming control module 300 as described herein.

In an example embodiment, the memory 314 may store fixed position information 350 indicative of a fixed geographic location of at least one base station. In some embodiments, the fixed position information 350 may be indicative of the fixed geographic location of a single base station of the ATG network 200. However, in other embodiments, the fixed position information 350 may be indicative of the fixed geographic location of multiple ones (or even all) of the base stations of the ATG network 200. In other embodiments, the fixed position information 350 may be stored at another memory device either onboard the aircraft 100, at any BS in the ATG network 200, at a location accessible to the network controller 240, or in the cloud. However, regardless of the storage location of the fixed position information 350, such information may be read out of memory and provided to (and therefore also received at) the processing circuitry 310 for processing in accordance with an example embodiment.

The processing circuitry 310 may also be configured to receive dynamic position information 360 indicative of a three dimensional position of at least one mobile communication station (which should be appreciated to be capable of transmission and reception of signaling in connection with two way communication). The mobile communication station may be a passenger device onboard the aircraft 100, or may be a wireless communication device of the aircraft 100 itself. The wireless communication device of the aircraft 100 may transfer information to and from passenger devices (with or without intermediate storage), or may transfer information to and from other aircraft communications equipment (with or without intermediate storage).

The dynamic position information 360 may be determined by any suitable method, or using any suitable devices. For example, the dynamic position information 360 may be determined using global positioning system (GPS) information onboard the aircraft 100, based on triangulation of aircraft position based on a direction from which a plurality of signals arrive at the aircraft 100 from respective ones of the base stations, using aircraft altimeter information, using radar information, and/or the like, either alone or in combination with each other. Thus, for example dynamic position information 360 may be GPS data provided from the aircraft 100 and/or any other augmenting information indicative of aircraft 100 location in 3D space. For example, altitude information, course/speed information, information indicative of the specific beam in which the aircraft 100 is located (and corresponding knowledge of bearing and elevation angle from a known fixed location), radar information, and other sources may be used to generate the dynamic position information 360. When, for example, the dynamic position information 360 includes information associated with specific beams, the information may be received from one or multiple base stations. Thus, in some cases a particular base station may receive the dynamic position information 360 in the form of information indicative of a position of the aircraft relative to a different base station (or base stations). However, the particular base station may also generate such information for itself and/or other base stations, aircraft, or network assets as well.

In an example embodiment, the processing circuitry 310 may be configured to enable beams to be formed either from the aircraft 100 toward a fixed node (e.g., one of the base station or the mobile communication station) or in the opposite direction. As mentioned above, the beams may be formed in real-time or in advance to anticipate a handover. In either case, the processing circuitry 310 may be configured to utilize information indicative of the locations of two devices or network nodes and determine where the network nodes are relative to one another from the perspective of either one of the network nodes (or both). Tracking algorithms may be employed to track dynamic position changes and/or calculate future positions based on current location and rate and direction of movement. After the expected relative position is determined, the processing circuitry 310 may be configured to provide instructions to direct formation of a beam from an antenna array of the second network node based on the expected relative position. The instructions may be provided to a control device that is configured to adjust characteristics of an antenna array (of either the mobile communication station or the base station) to form directionally steerable beams steered in the direction of the expected relative position. Such steerable beams may, for example, have azimuth and elevation angle widths of 5 degrees or less. Moreover, in some cases, such steerable beams may have azimuth and elevation angle widths of 2 degrees or less. However, larger sized steerable beams may also be employed in some embodiments.

In an example embodiment, the first network node may be disposed at (or be) the base station, and the second network node may be disposed at the mobile communication station (e.g., the aircraft 100 or communication equipment thereon). However, alternatively, the first network node could be the mobile communication station, and the second network node could be at the base station. Furthermore, multiple instances of the beamforming control module 300 may be provided so that both the mobile communication station and the base station may employ the beamforming control module 300. Alternatively or additionally, multiple instances of the beamforming control module 300 may be provided on multiple aircraft and/or on multiple base stations so that each device (or at least multiple devices) within the ATG network 200 may be able to direct steerable beams toward other devices in the network on the basis of using position information to estimate the relative position of a device to focus a beam toward the expected or estimated relative position either currently or at some future time.

In an example embodiment, the dynamic position information 360 may include latitude and longitude coordinates and altitude to provide a position in 3D space. In some cases, the dynamic position information 360 may further include heading and speed so that calculations can be made to determine, based on current location in 3D space, and the heading and speed (and perhaps also rate of change of altitude), a future location of the aircraft 100 at some future time. In some cases, flight plan information may also be used for predictive purposes to either prepare assets for future beamforming actions that are likely to be needed, or to provide planning for network asset management purposes. In some embodiments, the beamforming control module 300 may be disposed at the aircraft 100. In such cases, the fixed position information 350 may be provided for multiple base stations to define the network topology and may be stored in a memory device (e.g., memory 314) onboard the aircraft 100.

In an example embodiment, the beamforming control module 300 may be disposed at the network controller 240, which may be in communication with the base stations of the ATG network 200. In such an example, the beamforming control module 300 may be configured to receive dynamic position information 360 for a plurality of aircraft, and to provide expected relative position information for each aircraft relative to one of the base stations. Alternatively or additionally, the beamforming control module 300 may be configured to receive dynamic position information, and to provide expected relative position information for at least one aircraft relative to at least two base stations. In still other embodiments, the beamforming control module 300 may additionally or alternatively be configured to receive dynamic position information, and to provide multiple expected relative positions for respective different aircraft with respect to multiple base stations.

In some example embodiments, the beamforming control module 300 may further be configured to operate in a mesh network context. For example, the beamforming control module 300 may be configured to utilize dynamic position information associated with multiple aircraft in order to form mesh communication links between aircraft. Thus, for example, one aircraft could relay information to another aircraft from a terrestrial base station. In such an example, the expected relative position may be a relative position between two aircraft. In some embodiments, multiple "hops" between aircraft may be accomplished to reach remotely located aircraft, or even to provide self healing in a network where a particular ground station is not operating, but there are other aircraft in the area that can relay information to fill in the coverage gaps left by the non-operating ground station.

The system of FIG. 2 may therefore include one or more beamforming control modules 300 at one or more corresponding locations within the system. Regardless of the number and locations of such modules, the information associated therewith may be used to generate antenna array control data 365 that can be provided, for example, to aircraft antenna control units, beam control units, panel selection or steering elements, switches, and/or the like to form or control beams accordingly at either end of a two way communication link. The antenna array control data 365 may be used to control the amplitude and phase of antennas to form specific beams having the desired direction, elevation and range. The control provided may be expected to improve the performance of ATG network communications. However, for any of a number of reasons, system performance may not reach levels otherwise expected. Thus, it may be useful to analyze system performance either in real time or off line at a later time to evaluate the performance of various components and perhaps address any issues that may be identifiable. To accomplish this, some example embodiments may employ a network analytics control module (NACM) 400.

The NACM 400 may be used evaluate system performance based on a number of parameters that may be reported by assets within the ATG network 200. These parameters may be enabled to be correlated to each other to generate a historical picture of the performance of specific assets within the system. In particular, these parameters may allow the NACM 400 to passively monitor the parameters that are otherwise available in the system to gauge various factors that may indicate performance issues and perhaps also customer satisfaction in a way that allows for proactive issue resolution, troubleshooting and sometimes even system adjustment, to improve system performance with minimal input from the customer.

In an example embodiment, the NACM 400 may include processing circuitry 410 that may further include a processor 412 and memory 414 that may each be similar in function, capability, and in some cases also form to the corresponding processing circuitry 310, processor 312, and memory 314 described above except perhaps for differences in scale, packaging, programming, sub-modules/components and/or configuration. The device interface 420 and user interface 430 of the NACM 400 may also be similar to the corresponding components described above. Thus details regarding the structures of such components will not be repeated.

Figure 4:
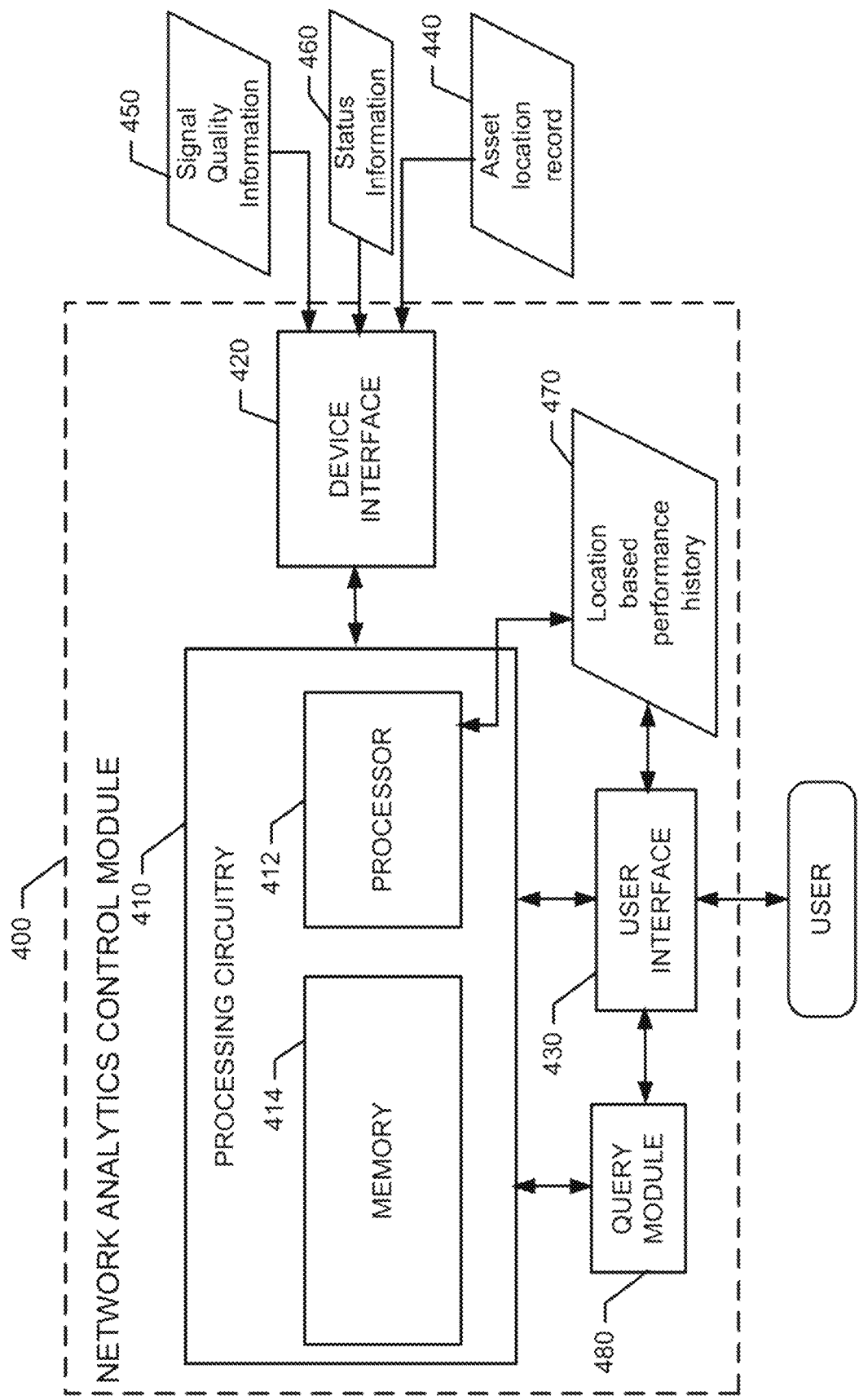
FIG. 4 illustrates network analysis control circuitry that may be employed to assist in using positional information and signal quality information for assisting with network control and planning functions according to an example embodiment.

In an example embodiment, the NACM 400 may be configured to receive any or all of various parameters shown in FIG. 4, in order to enable analysis of such parameters to ultimately enable network control functions to be performed. For example, the NACM 400 may receive (e.g., via the device interface 420) an asset location record 440 for one or more assets (e.g., aircraft or base station) that operate within the system. The asset location record 440 may be a record of the dynamic position information 360 described above (or information derived therefrom) that is time stamped or otherwise correlated to a specific series or history of locations and times for a given asset. Thus, in some cases, the asset location record 440 may effectively provide a picture in 3D space of the routes traveled by one or more aircraft through the coverage areas of a number of different base stations. However, the information of the asset location record 440 need not necessarily be provided in a manner that is aircraft-centric. The information could be correlated from the perspective of aircraft or other communication assets (e.g., base stations). Thus, the asset location record 440 may, in some cases, provide a picture in 3D space of the paths taken by various aircraft through the area served by a particular base station. As such, the asset location record 440 could have an aircraft-based location paradigm or a base station-based location paradigm in various different embodiments.

Regardless of the location paradigm employed by the asset location record 440, the information provided in the asset location record 440 includes both times and locations in 3D space for assets that may be known by tail number or other identification methods for aircraft, or by base station identifier, cell ID or other identification methods for base stations. Asset locations at corresponding times may be accurately known by any combination of location determining methods described above for determining dynamic position information 360 including augmentations of the dynamic position information 360 using after action reconstruction or additional information that might be available to augment the dynamic position information 360.

In an example embodiment, the NACM 400 may also be configured to receive signal quality information 450 as reported by various assets. The signal quality information 450 may be organized by asset and may also be time stamped or otherwise correlated to times at which the corresponding signal quality information 450 was received from respective assets. In this regard, for example, each aircraft may continuously or periodically report signal quality parameters (e.g., RSSI (received signal strength indicator), bandwidth (in uplink or downlink directions), etc.) such that the signal quality parameters for any given asset can be correlated to the location of the asset in 3D space (since location information is also stored based on time). In some cases status information 460 (e.g., radio on/off status) may also be provided to the NACM 400. The NACM 400 may be configured to generate (e.g., for an individual asset) a location based performance history 470 that may correlate at least the asset location record 440 along with one or both of the signal quality information 450 and the status information 460 by asset from any desirable perspective (e.g., from the perspective of base stations or aircraft).

The NACM 400 may be configured to generate the location based performance history 470 as a database of data that has been collected and collated using time as the basis for collating data associated with any particular asset. In this regard, for example, the signal quality information 450 is collated with the asset location record 440 (and/or status information 460) to provide an indication of signal quality over time for the various recorded locations of aircraft that are tracked by the system. As such, the location based performance history 470 may provide a temporally sequenced picture of the performance related parameters experienced at every location at which assets are located and operating/reporting within the ATG network 200 for one asset (e.g., aircraft or base station), for multiple assets, or for all assets of the ATG network 200. Thus, the location based performance history 470 may act as a data store for all the data necessary to generate a view of performance history for any selectable asset within the ATG network 200, and the performance history can be correlated to position in 3D space.

The NACM 400 may be configured to enable the user to conduct queries for individual assets to analyze and/or display information associated with the individual asset or assets that have been selected based on the location based performance history 470 for the asset(s) using, for example, a query module 480 configured to define a structure by which the user can interact the data in the location based performance history 470 to obtain specifically requested information. Alternatively or additionally, the NACM 400 may be programmed to cycle through assets to look for and identify issues based on programmed search criteria and/or programmed trigger events. In either case, data associated with one asset may be considered and analyzed with respect to other assets encountered in a given time period. For example, data registered in 3D time and space for all tail numbers or device identifiers for aircraft based assets that are encountered by a particular base station may analyzed to determine patterns or individual outliers that may indicate identifiable issues. Alternatively or additionally, data registered in 3D time and space for all base stations (or other assets such as aircraft operating in a mesh context or relaying information) that are encountered by a specific aircraft or device during a route traveled by the specific aircraft or device may be analyzed to determine patterns or individual outliers that may indicate identifiable issues.

As an example, the NACM 400 (via configuration of the processing circuitry 410 thereof) may be configured to extract location and signal strength information from the location based performance history 470 for a selected aircraft. The selected aircraft may be selected by the user, or may be automatically selected by the NACM 400 at random or as part of a sequence of automated queries set up to check all aircraft associated with a given organization or other group. The NACM 400 may then compare the signal strength information for the selected aircraft to corresponding signal strength information measured for other aircraft that have been at the same location (or within a predetermined distance of the same location) in 3D space. As such, the NACM 400 may be configured to compare every signal strength measurement taken at the same location in 3D space by other aircraft to the signal strength measured by the selected aircraft to determine if the selected aircraft experienced a lower than normal or expected signal strength. If, for example, the selected aircraft tends to have a lower signal strength measurement than other aircraft at the same location, it may be the case that the selected aircraft has equipment related issues on-board the selected aircraft that are causing the lower signal strength.

Accordingly, for example, the NACM 400 may be configured to identify situations in which the signal strength information associated with the selected aircraft differs from the signal strength information of other aircraft measured at the same location by at least a predetermined amount. In some cases, the signal strength information of other aircraft measured at the same location may be a composite (e.g., mean or average) signal strength value of other aircraft that have been within a predetermined distance from the same location. In response to the signal strength information of the selected aircraft being different from the composite signal strength value, a service alert may be generated to identify the selected aircraft. The service alert may be used to schedule an inspection of or maintenance on equipment onboard the selected aircraft.

In some examples, the NACM 400 may alternatively or additionally be configured to facilitate network planning and expansion opportunities. For example, the NACM 400 may be configured to receive the location information of all aircraft that use the system in 3D space along with the corresponding signal strength information reported by such aircraft at each location (and time). Thus, not only can the specific sectors or cells that are utilized most frequently be determined and understood, but the specific location within the cells or sectors at which the most data usage occurs can also be known. As such, bandwidth usage in both uplink and downlink directions may be mapped versus 3D location to understand the locational (and temporal) hot spots for either or both of uplink and downlink bandwidth consumption.

By having knowledge of the 3D locations (i.e., not just the cell or sector, but the direction, distance and altitude) at which usage occurs, planning may be conducted for resource allocation, network expansion, handover optimization, etc. With respect to resource allocation, if it is known that a particular location within a cell or sector tends to become heavily or lightly used over a specific period of time, channel size may be altered to address the issue. For example, for a lightly used location, channel size may be changed to a 40 MHz channel instead of a normal 20 MHz channel to provide a boost in bandwidth to aircraft passing through the area. Alternatively, if a location is heavily used, channel size may be change from a 20 MHz channel to a 10 MHz channel to accommodate the heavy usage for all users. As such, the NACM 400 may be configured to provide a usage alert to the user to identify specific locations in 3D space (and in some cases also the corresponding times) of heavy or light usage to allow the user to make network configuration changes accordingly. However, in other cases, the NACM 400 may be configured to interface with the network controller 240 to provide such information to the network controller 240, and the network controller 240 may make the changes to network configuration based on the information provided without user input.

In some cases, when network expansion is planned, new cell sites or sector capabilities may be added to improve the capabilities of the specific locations in 3D space. In this regard, for example, the NACM 400 may be configured to map usage in both uplink and downlink directions within 3D space so that it is known exactly where within each sector and/or cell the usage of resources occurs over time, targeted resource augmentation may be accomplished. In the past, traffic density has only been tracked on the sector level, and sectors may cover hundreds of square miles or kilometers. Thus, any understanding of hot spots for usage was previously very coarse in nature. By having a finer appreciation for the location of hot spots (and cool spots), network expansion and management can be enhanced.

With respect to network management, handover management may also be impacted. For example, by having knowledge of signal levels in 3D space, it may be possible to identify a potential handover issue, or may be possible to conduct a handover preemptively in order to avoid any handover issues. In some cases, a potential handover issue may be identified in 3D space so that a change in frequency or a minor azimuth change may be implemented within a sector to change a handover overlap point.

By having information on the identity of each aircraft with radio equipment for communication within the ATG network 200 (e.g., tail numbers), it may also be possible for the NACM 400 to determine when and where the radio equipment is flying at any given time. The status information 460 may indicate the radio status (e.g., on/off) for each aircraft. In particular, if an aircraft is flying without the radio equipment registering with the network, it may be appreciated that the aircraft likely has turned the radio equipment off, or there is some other type of fault in progress. In an example embodiment, the NACM 400 may issue an alert to the user when an aircraft flies without registering (i.e., with the radio off) either one time or a predetermined number of times. The alert may signal the user to either have sales or customer service personnel reach out to the customer to check on satisfaction with or operability of the equipment. Accordingly, for example, if the customer turned off the equipment due to poor performance, if the equipment was accidentally left off, or if there is a fault that the customer has not yet reported, proactive engagement may be performed to address the issue before the customer can become dissatisfied.

Example embodiments may therefore provide multiple ways by which customer experience may be inferred by monitoring various parameters passively in connection with time and location correlation of such parameters. Proactive resource management, customer engagement, and other activities may then be undertaken to improve system performance and customer satisfaction.

Figure 5:
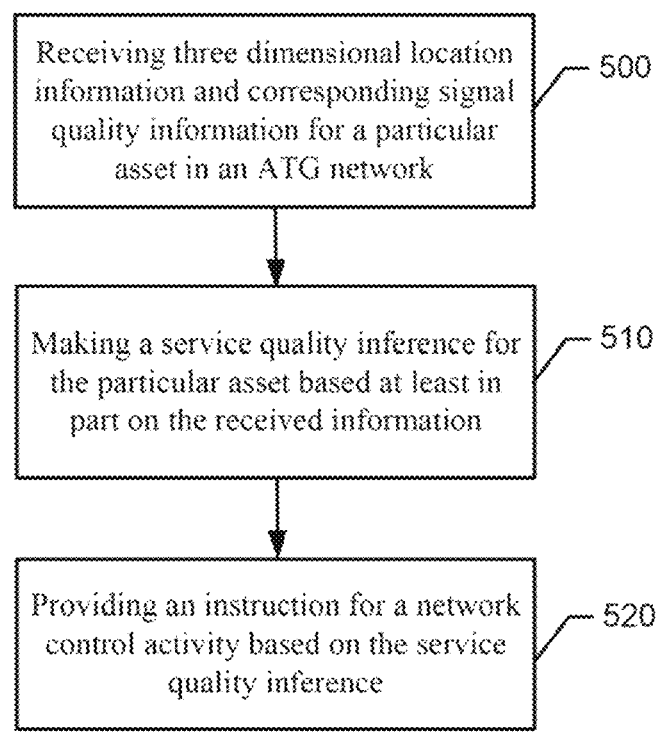
FIG. 5 illustrates a block diagram of a method for employing positional information and signal quality information for performing network control and planning functions in accordance with an example embodiment.

As such, the system of FIG. 2 may provide an environment in which the control modules of FIGS. 3 and 4 may provide a mechanism via which a number of useful methods may be practiced. FIG. 5 illustrates a block diagram of one method that may be associated with the system of FIG. 2 and the control modules of FIGS. 3 and 4. From a technical perspective, the NACM 400 described above may be used to support some or all of the operations described in FIG. 5. As such, the platform described in FIG. 2 may be used to facilitate the implementation of several computer program and/or network communication based interactions. As an example, FIG. 5 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a device (e.g., the NACM 400, and/or the like) and executed by a processor in the device. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s).

The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 5, may include receiving three dimensional location information and corresponding signal quality information for a particular asset in an ATG network at operation 500. The method may further include making a service quality inference for the particular asset based at least in part on the received information at operation 510. The service quality inference may, in particular, be a service quality inference that is applicable to a specific location within 3D space. Thus, the service quality inference may be said to be a location-specific service quality inference, where the location is a specific location within a cell or sector. The method may further include providing an instruction for a network control activity based on the service quality inference at operation 520.

Figure 6:
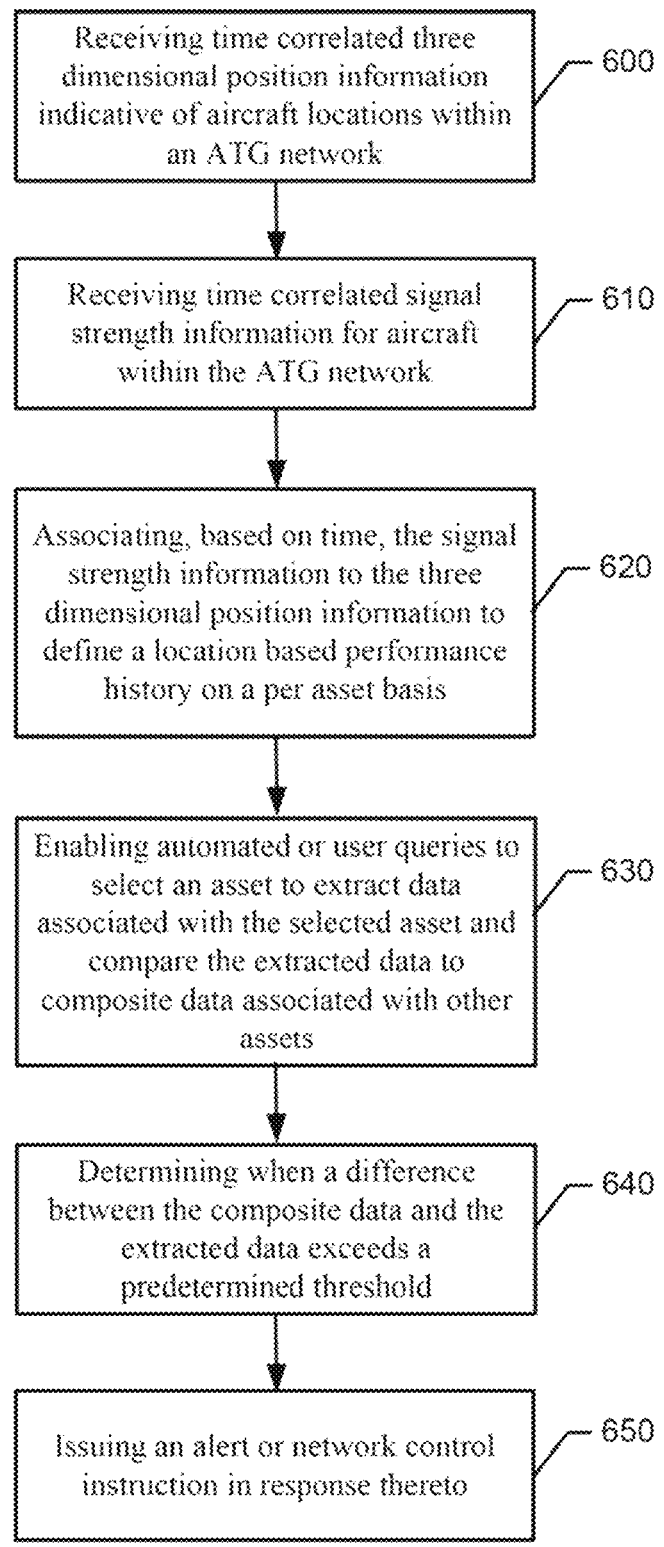
FIG. 6 illustrates a block diagram of a method for performing certain example network control and planning functions in accordance with an example embodiment.
Figure 7:
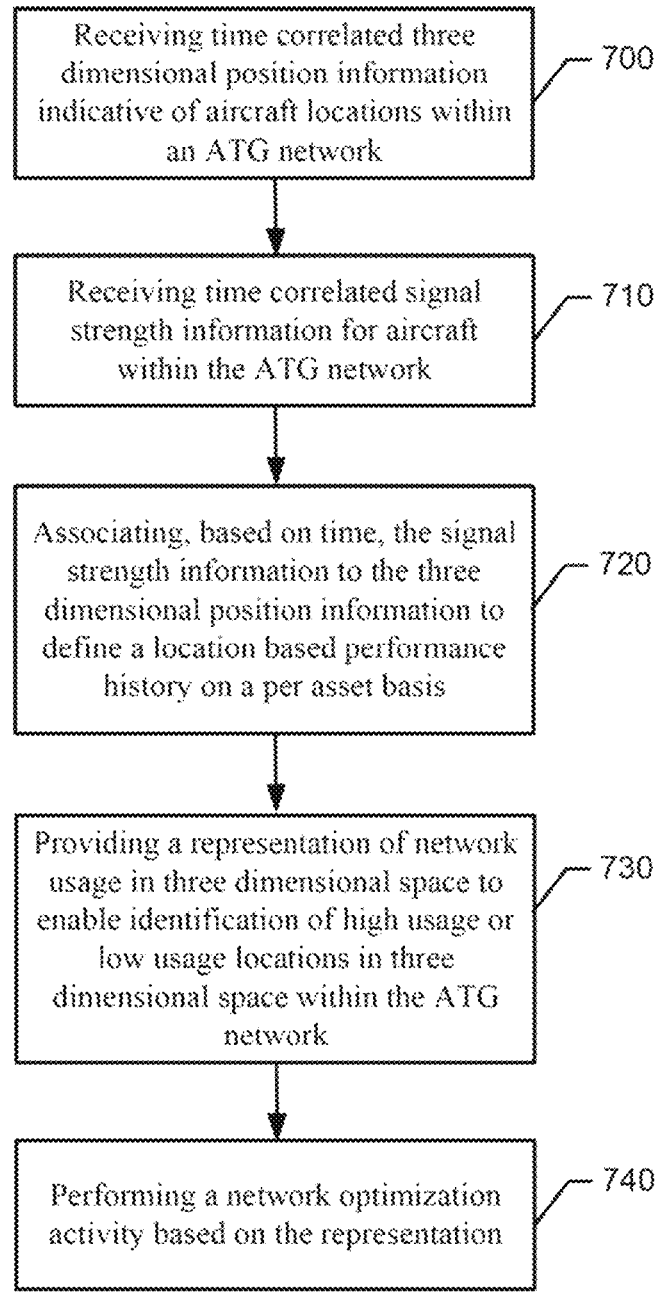
FIG. 7 illustrates a block diagram of a method for performing alternative example network control and planning functions in accordance with an example embodiment.

The method described above in reference to FIG. 5 may include additional steps, modifications, augmentations and/or the like to achieve specific service quality inferences, or to achieve specific network control activities. FIGS. 6 and 7 illustrate different examples in this regard. For example, FIG. 6 illustrates a block diagrams that may be illustrative of specific way of determining inferences and taking actions in accordance with an example embodiment.

As shown in FIG. 6, a method in accordance with another example embodiment may include receiving time correlated three dimensional position information indicative of aircraft locations within an ATG network at operation 600, and receiving time correlated signal strength information for aircraft within the ATG network at operation 610. The method may further include associating, based on time, the signal strength information to the three dimensional position information to define a location based performance history for an asset, or for multiple assets on a per asset basis, at operation 620. Thereafter, queries (e.g., user initiated or automated queries) may be employed to select an asset to extract data associated with the selected asset and compare the extracted data to composite data associated with other assets at operation 630. A difference may then be determined between the composite data and the extracted data to see whether the difference exceeds a predetermined threshold at operation 640. If the different exceeds the predetermined threshold, then an alert or network control instruction may be issued at operation 650. The alert or network control instructions may include instructions to change channel parameters or frequency. Thus, for example, a switch between the use of unlicensed vs. licensed band frequency, a switch between ATG and satellite communication, or other such changes may be planned in advance for specific locations where such a shift would be advantageous based on offline processing of data correlating specific performance parameters to corresponding specific times and locations in 3D space.

FIG. 7 illustrates a block diagram that may be illustrative of specific modifications to the general method described in reference to FIG. 5. In this regard, for example, operation 500 may, in some cases, be further defined by receiving time correlated three dimensional position information indicative of aircraft locations within an ATG network at operation 700, and receiving time correlated signal strength information for aircraft within the ATG network at operation 710. In some cases, operation 500 may further include associating, based on time, the signal strength information to the three dimensional position information to define a location based performance history on a per asset basis at operation 720. The method may further include providing a representation of network usage in three dimensional space to enable identification of high usage or low usage locations in three dimensional space within the ATG network at operation 730. The method may further include performing a network optimization activity based on the representation at operation 740. The network optimization may include, among other things, for example, adjusting frequency or azimuth for a sector involved in a handover of the aircraft, or generating a recommendation to add capacity at a location having a usage volume above a predetermined threshold.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A network analytics control module comprising processing circuitry configured to:
    receive an asset location record defining a record of three dimensional location information and corresponding signal quality information for a corresponding beam serving a particular wireless communication asset in an air-to-ground (ATG) network at each recorded three dimensional location;
    make a service quality inference for the particular wireless communication asset based at least in part on the asset location record; and provide an instruction for a network control activity based on the service quality inference.

2. The module of claim 1, wherein the asset location record comprises:
time correlated three dimensional position information indicative of aircraft locations within the ATG network of an aircraft on which the particular wireless communication asset is located;
time correlated signal strength information for the aircraft within the ATG network; and
a location based performance history for the aircraft associating, based on time, the signal strength information to the three dimensional position information.

3. The module of claim 2, wherein making the service quality inference comprises comparing data extracted from the location based performance history for a selected asset to composite data associated with other assets from the location based performance history and determining when a difference between the composite data and the data extracted from the location based performance history for the selected asset exceeds a predetermined threshold.

4. The module of claim 3, wherein providing the instruction comprises issuing a user alert.

5. The module of claim 3, wherein providing the instruction comprises issuing a network control instruction to change channel parameters.

6. The module of claim 3, wherein the comparing is performed responsive to a user query.

7. The module of claim 3, wherein the comparing is performed responsive to an automatically generated query.

8. The module of claim 3, wherein providing the instruction comprises issuing a network control instruction to change channel frequency.

9. The module of claim 2, wherein making the service quality inference comprises providing a representation of network usage in three dimensional space from a selected one of an aircraft-based location paradigm and a base station-based location paradigm to enable identification of usage volume at respective locations in the three dimensional space within the ATG network.

10. The module of claim 9, wherein providing the instruction comprises performing a network optimization activity based on the representation.

11. The module of claim 10, wherein the network optimization activity comprises adjusting frequency or azimuth for changing a handover overlap point within a sector involved in a handover of the aircraft.

12. The module of claim 9, wherein the network optimization activity comprises generating a recommendation to add capacity at a location having a usage volume above a predetermined threshold.

13. An air-to-ground (ATG) network comprising:
a plurality of base stations disposed at respective fixed geographic locations;
at least one aircraft;
a beamforming control module comprising processing circuitry configured to provide instructions to direct beam formation from an antenna array of the aircraft or one of the base stations based on three dimensional location information associated with the aircraft; and
a network analysis control module comprising processing circuitry configured to:
receive an asset location record defining a record of the three dimensional location information and corresponding signal quality information for a corresponding beam serving a particular wireless communication asset in an air-to-ground (ATG) network at each recorded three dimensional location;
make a service quality inference for the particular wireless communication asset based at least in part on the asset location record; and
provide an instruction for a network control activity based on the service quality inference.

14. The network of claim 13, wherein the asset location record comprises:
time correlated three dimensional position information indicative of aircraft locations within the ATG network of an aircraft on which the particular wireless communication asset is located;
time correlated signal strength information for the aircraft within the ATG network; and
a location based performance history for the aircraft associating, based on time, the signal strength information to the three dimensional position information.

15. The network of claim 14, wherein making the service quality inference comprises comparing data extracted from the location based performance history for a selected asset to composite data associated with other assets from the location based performance history and determining when a difference between the composite data and the data extracted from the location based performance history for the selected asset exceeds a predetermined threshold.

16. The network of claim 15, wherein providing the instruction comprises issuing a user alert or issuing a network control instruction to change channel parameters or frequency.

17. The network of claim 14, wherein making the service quality inference comprises providing a representation of network usage in three dimensional space from a selected one of an aircraft-based location paradigm and a base station-based location paradigm to enable identification of usage volume at respective locations in the three dimensional space within the ATG network.

18. The network of claim 17, wherein providing the instruction comprises performing a network optimization activity based on the representation.

19. The network of claim 18, wherein the network optimization activity comprises adjusting frequency or azimuth for changing a handover overlap point within a sector involved in a handover of the aircraft.

20. The network of claim 18, wherein the network optimization activity comprises generating a recommendation to add capacity at a location having a usage volume above a predetermined threshold.

* * * * *